B. S. BURGAN.
Horse Hay-Fork.
No. 83,598.
Patented Nov. 3, 1868.
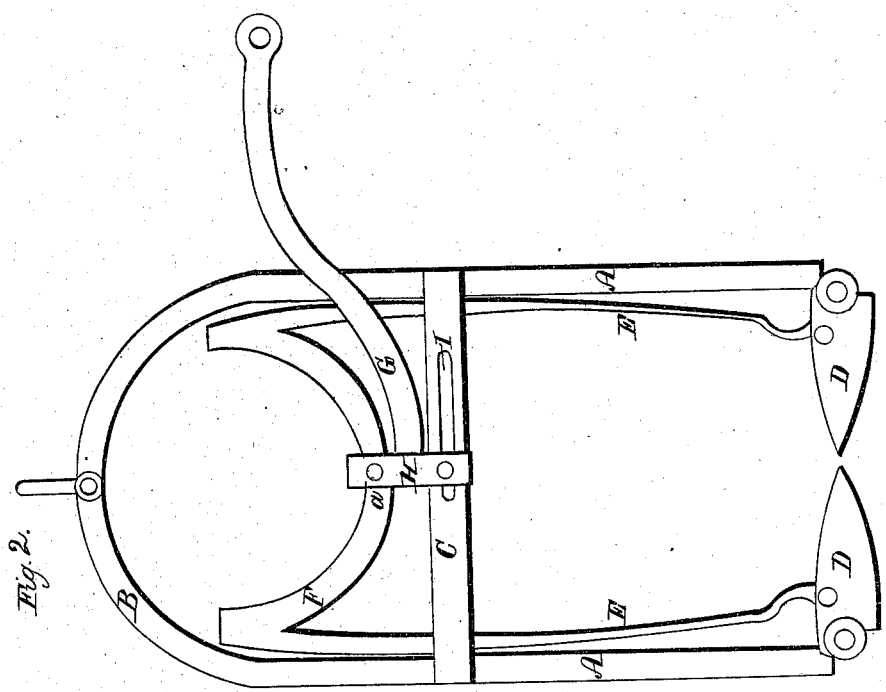
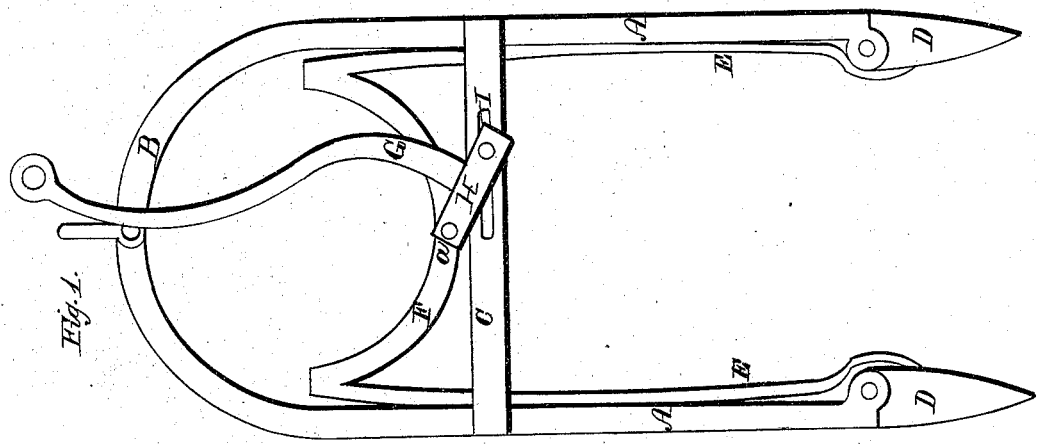

United States Patent Office.

B. S. BURGAN, OF CONGRESS, OHIO.

Letters Patent No. 83,598, dated November 3, 1868.

IMPROVEMENT IN HORSE HAY-FORKS.

The Schedule referred to in these Letters Patent and making part of the same.

*To all whom it may concern:*

Be it known that I, B. S. BURGAN, of Congress, in the county of Wayne, and State of Ohio, have invented a certain new and useful Improvement in Horse Hay-Forks; and I do hereby declare that the following is a full and complete description of the same, reference being had to the accompanying drawings, making a part of this specification, in which—

Figure 1 is a view of the fork, when opened.

Figure 2, a view of the fork, when closed or loaded.

Like letters of reference refer to like parts in the several views.

The nature of this invention relates to a horse hay-fork, constructed with two tines, each tine having a point, which operate conjointly with each other, whereby a small amount of hay, or hay that is short, can be taken up, and removed from the load to the stack or the bay.

In fig. 1, A represents the two tines or limbs of the fork, and which are connected to each other by a bow, B, braced by a cross-bar, C.

To the lower end of each limb is pivoted a foot, D.

To each foot is pivoted a link, E. Said links are connected at their upper ends by an inverted bow, F, whereby the feet are operated by the lever G, said lever being pivoted to the inverted bow, at the point *a*, by means of a cross-arm, H, whereas the other arm is attached to the cross-bar C by means of a pin, *b*, therein inserted, and which moves in a slot, I, as and for a purpose hereinafter shown.

The practical operation of this fork is as follows:

It is suspended over the load by an appropriate arrangement of ropes and pulleys, and whereby it is drawn up or lifted, when charged with hay, by thrusting it down into the hay, when in the position shown in fig. 1.

In this position, it will be observed that the feet are pointing downward, so that they will enter the hay with ease and facility, which, being done, the points of the feet are brought together, as shown in fig. 2, by drawing down upon the lever G, the result of which will be to push upward the inverted bow by means of the cross-arm H, thereby lifting the feet to the position shown, thus holding the hay securely between the limbs of the fork.

The loaded fork is now lifted by the above-mentioned ropes and pulleys, and conveyed over to the stack or bay, where it is discharged by springing the fork, by pulling upward the lever G, so as to bring the cross-arm from its vertical position, which will allow the inverted bow to descend, and the feet to assume the position in fig. 1, which will allow the hay to fall from the stack or bay.

In bringing the feet to the position shown in fig. 2, the pin *b*, as it slides along in the slot, serves as a fulcrum for the lever, on which the bow F is pushed up for closing the feet. The cross-arm being in a vertical position, brings the pivot and the pin in a right line, in the direction of the draught, and hence locks the fork.

This fork enters the hay with much ease and facility, and will take up and hold securely hay that is very short, or when but little in quantity—a matter of much importance in the handling of hay.

What I claim as my invention, and desire to secure by Letters Patent, is—

The links E, bow F, lever G, and cross-bar C, as arranged to operate in combination with the feet D and limbs A, substantially as and for the purpose described.

B. S. BURGAN.

Witnesses:
J. H. BURRIDGE,
FRANK S. ALDEN.